(12) United States Patent
Samdani et al.

(10) Patent No.: US 10,817,483 B1
(45) Date of Patent: Oct. 27, 2020

(54) SYSTEM FOR DETERMINING AND MODIFYING DEPRECATED DATA ENTRIES

(71) Applicant: TOWNSEND STREET LABS, INC., San Francisco, CA (US)

(72) Inventors: Rajhans Samdani, San Francisco, CA (US); Pratyus Patnaik, Los Altos, CA (US); David Colby Kaneda, San Francisco, CA (US); Suchit Agarwal, San Francisco, CA (US); Nathaniel Ackerman Rook, San Francisco, CA (US); William Stone Potter, San Francisco, CA (US); Jay Srinivasan, San Francisco, CA (US)

(73) Assignee: TOWNSEND STREET LABS, INC., San Francisco, CA (US)

( * ) Notice: Subject to any disclaimer, the term of this patent is extended or adjusted under 35 U.S.C. 154(b) by 580 days.

(21) Appl. No.: 15/610,183

(22) Filed: May 31, 2017

(51) Int. Cl.
*G06F 16/21* (2019.01)
*G06F 16/958* (2019.01)
*G06F 16/2457* (2019.01)

(52) U.S. Cl.
CPC ........ *G06F 16/21* (2019.01); *G06F 16/24578* (2019.01); *G06F 16/958* (2019.01)

(58) Field of Classification Search
None
See application file for complete search history.

(56) References Cited

U.S. PATENT DOCUMENTS

| | | | |
|---|---|---|---|
| 6,026,388 A | 2/2000 | Liddy et al. | |
| 6,385,329 B1 * | 5/2002 | Sharma | G06T 1/0064 348/E7.061 |
| 8,886,587 B1 | 11/2014 | Hainsworth et al. | |
| 9,245,271 B1 * | 1/2016 | Ahmed | G06F 16/9558 |
| 10,565,181 B1 * | 2/2020 | Hjermstad | G06F 16/2358 |
| 2004/0072143 A1 | 4/2004 | Timmis et al. | |
| 2004/0243568 A1 | 12/2004 | Wang et al. | |
| 2005/0086046 A1 | 4/2005 | Bennett | |
| 2005/0094848 A1 * | 5/2005 | Carr | G06T 1/0064 382/100 |
| 2006/0160065 A1 | 7/2006 | Timmis et al. | |

(Continued)

OTHER PUBLICATIONS

Truong, Dennis, "Non-final Office Action dated Dec. 10, 2019", U.S. Appl. No. 15/373,312, The United States Patent and Trademark Office, dated Dec. 10, 2019.

(Continued)

*Primary Examiner* — Richard L Bowen
(74) *Attorney, Agent, or Firm* — Lindauer Law, PLLC

(57) ABSTRACT

Systems and methods for determining whether a data entry has deprecated may receive a query from a user device and provide a data entry responsive to the query. If user feedback associated with the response indicates that the response resolved the query, confirmation data that associates the data entry with the query parameters is generated. If the user feedback indicates that the response did not resolve the query, existing confirmation data is accessed to determine whether a previous association between the data entry and the parameters of the query was generated. If correspondence between the confirmation data and the query and response is determined, a notification indicating the deprecation of the data entry is generated and the data entry may be suppressed from future output.

20 Claims, 6 Drawing Sheets

(56) References Cited

U.S. PATENT DOCUMENTS

| | | |
|---|---|---|
| 2008/0052056 A1 | 2/2008 | Timmis et al. |
| 2008/0071769 A1* | 3/2008 | Jagannathan ....... G06F 16/2453 |
| 2010/0076998 A1 | 3/2010 | Podgorny et al. |
| 2012/0078890 A1 | 3/2012 | Fan et al. |
| 2013/0007037 A1 | 1/2013 | Azzam et al. |
| 2013/0212096 A1 | 8/2013 | Shahar |
| 2014/0040181 A1 | 2/2014 | Kuznetsov |
| 2014/0120513 A1* | 5/2014 | Jenkins .................. G06F 17/27 |
| | | 434/362 |
| 2014/0149411 A1 | 5/2014 | Anand et al. |
| 2014/0172882 A1 | 6/2014 | Clark et al. |
| 2015/0172294 A1 | 6/2015 | Bittner et al. |
| 2016/0034457 A1* | 2/2016 | Bradley ............ G06F 16/24522 |
| | | 707/749 |
| 2016/0171373 A1 | 6/2016 | Allen et al. |
| 2016/0180726 A1 | 6/2016 | Ahuja et al. |
| 2016/0188575 A1* | 6/2016 | Sawaf ..................... G06F 40/51 |
| | | 704/2 |
| 2016/0335554 A1 | 11/2016 | Koll et al. |
| 2017/0004204 A1* | 1/2017 | Bastide ............... G06F 16/3329 |
| 2017/0228372 A1 | 8/2017 | Moreno et al. |
| 2017/0242899 A1 | 8/2017 | Jolley et al. |
| 2017/0243107 A1 | 8/2017 | Jolley et al. |
| 2018/0144064 A1 | 5/2018 | Krasadakis |
| 2018/0173698 A1* | 6/2018 | Dubey ................ G06F 16/3347 |
| 2018/0212904 A1 | 7/2018 | Smullen et al. |
| 2018/0285423 A1* | 10/2018 | Ciano ................ G06Q 30/0241 |
| 2019/0108486 A1 | 4/2019 | Jain et al. |

OTHER PUBLICATIONS

To, Baoquoc N., "Non-final Office Action dated Feb. 10, 2020", U.S. Appl. No. 15/942,342, The United States Patent and Trademark Office, dated Feb. 10, 2020.

\* cited by examiner

US 10,817,483 B1

SYSTEM FOR DETERMINING AND MODIFYING DEPRECATED DATA ENTRIES

BACKGROUND

Individuals within companies or other organizations may submit requests for information or services. The requests may be processed by a variety of systems. User input may be used to determine whether the responses provided to the requests are relevant.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
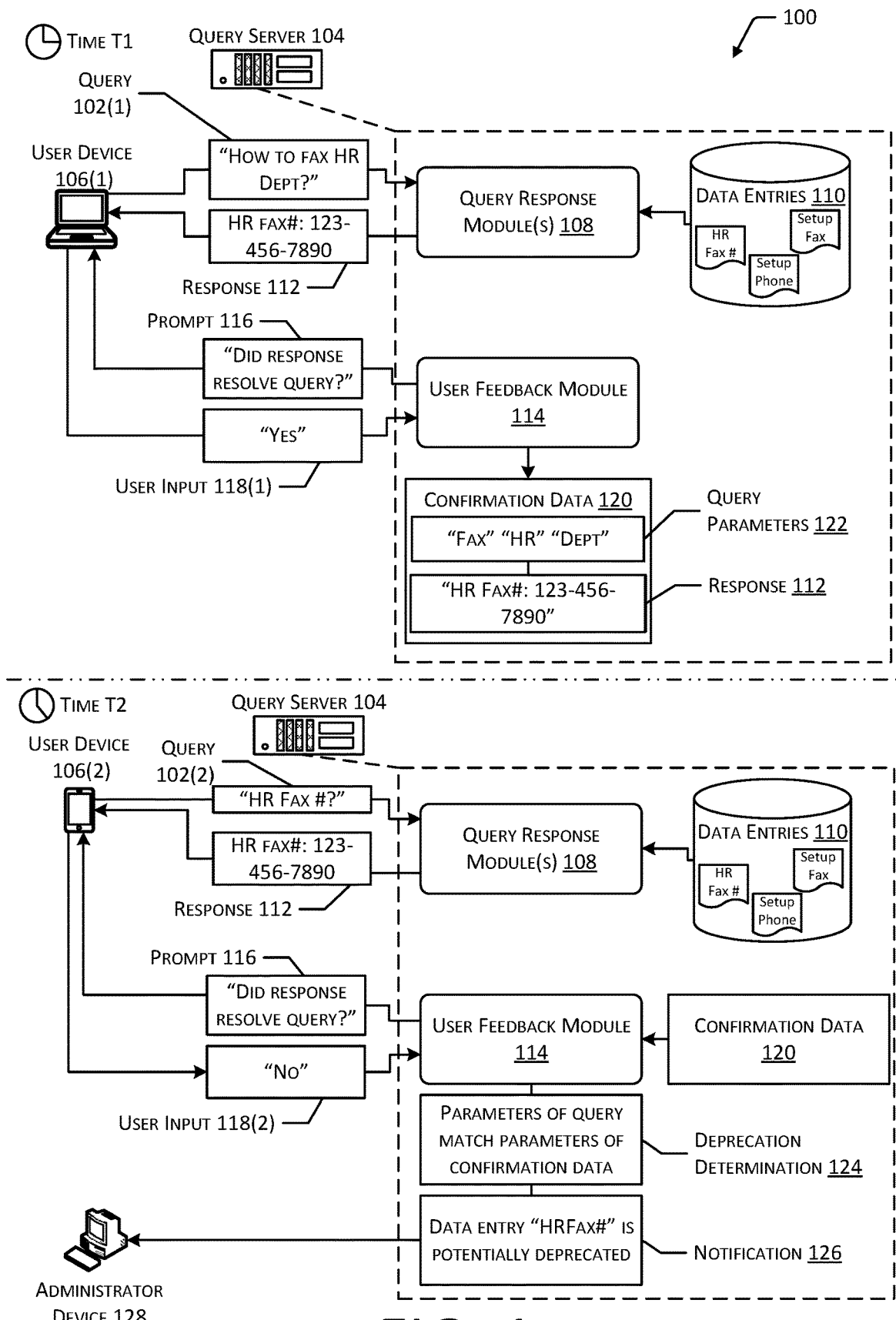
FIG. 1 depicts an implementation of a system for determining deprecation of data entries based on user interactions.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Companies and other organizations may process requests for information or services from a user through various types of partially-automated systems, such as ticketing systems, or by manually processing requests. For example, an employee of a company may electronically submit a query, such as "What is the fax number for the human resources department?", "How do I set up my computer to send faxes?", "How do I enroll in the company benefits program?", or "What is the Wi-Fi password in the employee lounge?". In some cases, the employee may transmit the query, such as through e-mail or a messaging program, to a department or a particular individual associated with the company. In other cases, the employee may transmit the query through a web portal or messaging system. Periodically, a company may review the queries that were resolved during a period of time and create data entries, such as articles, or other sources of knowledge that may be used to answer subsequent queries of a similar nature. For example, if a company receives numerous questions regarding the process for enrolling employees in a benefits program, an individual within the company may generate a web page, article, or other type of data entry that explains this process. Subsequent queries relating to enrollment in a benefits program may be resolved by directing the employee providing the subsequent query to the existing data entry.

In some cases, the relevancy of a data entry may decrease. For example, if a company relocates to a new building or changes the Wi-Fi password for a certain location, a data entry that contains the company address or Wi-Fi password would no longer be accurate. As another example, if a company purchases a new fax machine that includes additional functions when compared to a previous model, an existing data entry regarding the fax machine may be partially relevant, but may lack information regarding the additional functions. At any time, one or more changes within a company may cause an existing data entry to become less complete, less accurate, no longer relevant, or in some cases, a hindrance.

User input may be requested to determine whether a data entry sufficiently resolved a query. However, if user input indicates that a data entry did not resolve a query, the user input, alone, may not indicate whether the data entry has become inaccurate, or whether the search algorithm that selected the data entry for inclusion in a response selected a non-relevant data entry. For example, a search algorithm may identify particular terms or parameters of a query, and corresponding terms or parameters within one or more existing data entries, to attempt to determine a data entry that is responsive to the query. However, if the query includes unusual terms or an unusual arrangement of parameters, or if the search algorithm fails to recognize particular query parameters, the resulting data entry may be irrelevant with regard to the query, but may still contain accurate and complete information. Conversely, the search algorithm may successfully identify a data entry that was previously responsive to other, similar queries, but due to changes within an organization, the information in the data entry may no longer be complete or accurate. If the data entry is no longer complete or accurate, deletion or modification of the data entry may be appropriate. However, if the data entry is not incomplete or inaccurate, modification of the data entry is not necessary and may result in the removal or modification of accurate information.

Described in this disclosure are techniques for determining data entries that may have become deprecated (e.g., less complete or relevant) and causing the data entries to be modified or confirmed as relevant. Over a period of time, one or more queries may be received, each query including various query terms and parameters. Correspondence between the query parameters and the parameters of a body of existing data entries may be used to determine one or more particular data entries to be provided responsive to the queries. Example techniques for determining data entries that are responsive to queries are described in U.S. patent application Ser. No. 15/373,312, filed Dec. 8, 2016 and issued as U.S. Pat. No. 10,685,047 on Jun. 16, 2020, entitled "Request Processing System", which is incorporated by reference herein in its entirety.

When at least a portion of a data entry is provided in a response to a query, user input may be received, indicating whether the data entry is responsive or non-responsive to the query. For example, if the user input indicates that the data entry resolved the query, confirmation data may be generated that associates the data entry with one or more query parameters of the query. As a data entry is provided in response to various queries over a period of time, the resulting confirmation data may associate any number of queries or parameters with the data entry.

At a future time, the data entry may be provided in response to a subsequent query. However, user input may indicate that the data entry did not resolve the query. Responsive to the user input, correspondence between the parameters of the query and the parameters of the confirmation data that are associated with the data entry may be determined. If the query parameters and the parameters of the confirmation data do not correspond, then the user input may indicate that an incorrect data entry was provided responsive to the query, but may not be useful for determining the accuracy or completeness of the data entry. However, if the query parameters and the parameters of the confirmation data correspond, then this correspondence may indicate that while the data entry resolved previous queries of a similar nature in the past, the data entry did not successfully resolve the current query. In some cases, this correspondence may indicate that at least a portion of the information in the data entry is no longer accurate or complete.

Responsive to the correspondence between the query and the confirmation data, a notification may be generated indicating that the data entry may have deprecated. The notification may be configured to cause automatic or manual modification of the data entry. For example, a notification may be configured to cause user review of the data entry, such as by an administrator or other individual responsible for maintaining the data entry, responsive to which additional user input may be received. The additional user input may delete the data entry, modify the data entry, merge the data entry with another existing data entry, and so forth. Alternatively, the user input may confirm that the data entry is complete and accurate. In some implementations, the notification may be configured to cause automatic suppression of a data entry from subsequent responses. For example, if a notification is generated with regard to a data entry, but no user input responsive to the notification has been received, the data entry may be suppressed from subsequent query responses, even in cases where the parameters of the data entry correspond to those of a subsequent query.

In some implementations, the deprecation of a data entry may be determined based on a quality score associated with the data entry. For example, when user input is received that indicates that the data entry resolved a query, the quality score for that data entry may be increased. When user input is received that indicates that the data entry did not resolve a query, and correspondence between the confirmation data and the query parameters indicates that the data entry previously resolved one or more similar queries, the quality score for the data entry may be decreased. If the quality score for the data entry falls below a threshold quality score, a notification indicating the possible deprecation of the data entry may be generated. After user input modifying or confirming the data entry is received, the quality score for the data entry may be set to a default value greater than the threshold quality score.

In some cases, the quality score for a data entry may be prevented from exceeding a maximum value or falling below a minimum value. For example, a data entry that has existed for a significant period of time may have been provided responsive to numerous queries, resulting in a high quality score. If the circumstances associated with a company change in a manner that renders the data entry no longer relevant, the data entry may be provided in numerous responses before the quality score is decreased to a value less than the threshold value. Retaining the quality score below a maximum value may reduce the number of instances that an irrelevant data entry will be provided before the quality score is below the threshold quality score.

In other cases, the quality score for a data entry may be modified asymmetrically based on the age of the data entry or the number of previous queries or parameters that are associated with the data entry. For example, if user input indicating the quality of a data entry is received, the quality score for the data entry may be increased by an amount (e.g., a value) that varies inversely with the age or number of previous queries or parameters associated with the data entry. Continuing the example, the quality score may be increased by an amount inversely proportional to the age or count of previous queries or parameters. In one implementation, the quality score may be increased by an amount proportional to one divided by the square root of the age or count of previous queries or parameters. Asymmetric modification of quality scores based on the age or count of queries or parameters associated with a data entry may cause the amount by which a quality score for an older data entry is increased based on user input to be small. The amount by which the quality score for the data entry is decreased based on negative user input may be larger, which may reduce the number of instances that an irrelevant data entry will be provided before the quality score is below the threshold quality score. Asymmetric modification of quality scores may also enable newer data entries to attain an increased quality score more rapidly than an older data entry, which may prevent newer data entries from becoming suppressed due to a small quantity of negative user input.

In some implementations, user input may indicate that a data entry contains particularly erroneous, dangerous, or hindering information, which may result in the generation of a notification independent of the quality score associated with the data entry. In other implementations, the effect of user input may be weighted based on the source of the user input. For example, user input from an administrative user may result in a larger increase or decrease in a quality score compared to user input from other users. As another example, if a data entry is provided by a human user in a response to a query, this may result in an increase to the quality score for that data entry by an amount greater than the increase associated with user feedback.

Identification of potentially deprecated data entries and other resources may enable the efficiency of knowledge-based systems to be improved significantly. For example, potentially deprecated data entries may be automatically suppressed from output in subsequent searches, resulting in the resolution of queries in a shorter amount of time, using a smaller quantity of computing resources and a smaller quantity of human resources. Additionally, the automatic identification of potentially deprecated data entries may streamline the process of maintaining knowledge-based resources by facilitating the location of data entries that may be affected by changes in an organization without requiring manual review to locate such data entries.

FIG. 1 depicts an implementation of a system 100 for determining deprecation of data entries based on user interactions. At a first time T1, to obtain information, a user may provide a query 102(1) to a query server 104 using a user device 106(1). The user device 106(1) may include any type of computing device including, without limitation, a smartphone, tablet computer, wearable computer, or other type of mobile or portable device, a desktop computer, laptop computer, or other type of personal computer, an automotive computer, a set-top box, a server, a game controller, and so forth. While FIG. 1 depicts a single user device 106(1) providing the query 102(1) directly to the query server 104, in other implementations, the user device 106(1) may include multiple computing devices, or the user device 106(1) may provide the query 102(1) to one or more intermediate computing devices, which in turn provide the query 102(1) to the query server 104. In still other implementations, a query 102(1) may be provided directly to the query server 104, and use of a user device 106(1) may be omitted. Additionally, while FIG. 1 depicts a single query server 104 receiving the query 102(1), the query server 104 may include any number and any type of computing devices including, without limitation, the types of computing devices described with regard to the user device 106(1). The query 102(1) may include any manner of data including, without limitation, alphanumeric data, audio data, image data, and so forth. For example, FIG. 1 depicts the query 102(1) including the text "How to fax HR Dept.?", which may be input using a keyboard, touch sensor, microphone, camera, scanner, or other input device associated with the user device 106(1).

One or more query response modules 108 associated with the query server 104 may receive and analyze the query 102(1). The query response module(s) 108 may determine correspondence between the terms and other parameters of the query and the parameters of one or more data entries 110. Example methods for analyzing a query 102(1) and determining one or more corresponding data entries 110 are described in U.S. patent application Ser. No. 15/373,312, incorporated by reference previously. The query response module(s) 108 may generate a response 112 based on at least one corresponding data entry 110 and provide the response to the user device 106(1). For example, FIG. 1 depicts a response 112 provided to the user device 106(1) that includes the text "HR Fax #: 123-456-7890". The response 112 may include any manner of data including, without limitation, alphanumeric data, audio data, image data, and so forth. In some implementations, the response 112 may include a link or information that may be used to access a separate source of information.

Subsequent to provision of the response 112 to the user device 106(1), a user feedback module 114 associated with the query server 104 may provide a prompt 116 to the user device 106(1) requesting user input 118(1) indicative of the relevancy of the response 112. For example, FIG. 1 depicts the prompt 116 including the text "Did response resolve query?". FIG. 1 further depicts the user device 106(1) providing user input 118(1) responsive to the prompt 116 that includes the text "Yes". The prompt 116 may include any type of data, including one or more of alphanumeric data, audio data, image data, video data, and so forth. The prompt 116 may further include any type of user interface configured to receive user input 118(1). The user input 118(1) may similarly include any type of data, including one or more of alphanumeric data, audio data, image data, video data, and so forth. For example, the prompt 116 may include one or more buttons, menus, or other types of selection features, or one or more features configured to receive text, audio, or other types of user input 118(1).

The user feedback module 114 may receive and analyze the user input 118(1) to determine whether the user input 118(1) indicates that the response 112 is relevant or irrelevant with regard to the query 102(1). For example, the user feedback module 114 may be configured to recognize positive user input 118(1) such as the text "Yes" or "Y", or user input 118(1) selecting a button or other type of selector that corresponds to a positive indication of relevancy. The user feedback module 114 may similarly be configured to recognize negative user input 118.

Responsive to the receipt of positive user input 118(1), the user feedback module 114 may generate confirmation data 120 that associates one or more query parameters 122 of the query 102(1) with an indication of the response 112 or data entry 110 provided to the user device 106(1). In some implementations, the user feedback module 114 may receive data indicative of the query parameters 122 and the response 112 that was provided to the user device 106(1) from the query response module(s) 108. In other implementations, the user feedback module 114 may be configured to determine one or more of the query parameters 122 and the response 112 based on one or more of the query 102(1) or the stored data entries 110. The confirmation data 120 may indicate that the response 112 or data entry 110 was relevant to a query 102(1) that included the associated query parameters 122.

At a second time T2 subsequent to the first time T1, the query server 104 may receive a second query 102(2) from a second user device 106(2). The second query 102(2) may include one or more parameters similar to those of the first query 102(1). For example, FIG. 1 depicts the second query 102(2) including the text "HR Fax #?" The query response module(s) 108 may determine one or more data entries 110 that correspond to the parameters of the second query 102(2) and provide a response 112 based on the data entries 110. For example, because the second query 102(2) is similar to the first query 102(1) received at the first time T1, the same response 112 may be provided responsive to the second query 102(2).

However, subsequent to the first time T1, one or more circumstances may have changed in a manner that renders the response 112 unsuitable to resolve the second query 102(2) received at the second time T2. For example, a company may modify or replace a phone system, relocate personnel or departments to different offices, add or remove personnel or departments, relocate the entire company to a different structure, and so forth. Therefore, information within a data entry 110 that was previously accurate and complete at the first time T1 may no longer be accurate or complete at the second time T2.

Subsequent to providing the response 112 to the second user device 106(2), the user feedback module 114 may provide a prompt 116 to the user device 106(2) requesting user input 118(2). If one or more circumstances have changed such that the response 112 is no longer suitable for resolving queries 102 having the query parameters 122 determined at the first time T1, the user input 118(2) may include a negative response. For example, responsive to a prompt 116 including the text "Did response resolve query?", the user input 118(2) may include the text "No".

Responsive to the receipt of negative user input 118(2) regarding the relevancy of the response 112, the user feedback module 114 may access the confirmation data 120 and determine whether the confirmation data 120 indicates an association between one or more parameters of the second query 102(2) and the response 112 provided to the user device 106(2). If the confirmation data 120 does not indicate an association between the query parameters 122 and the response 112, then the negative user input 118(2) may indicate that the query response module(s) 108 erroneously determined a data entry 110 that was not relevant to the query 102(2). For example, one or more data entries 110 may be improperly classified, or the query response module 108 may improperly analyze the parameters of a query 102(2), which may result in the generation of a response 112 based on a data entry 110 that does not truly correspond to the parameters of the query 102(2). However, if the confirmation data 120 indicates an association between the query parameters 122 and the response 112, this may indicate that at a previous time T1, the response 112 was complete and accurate with regard to the query parameters 122, but at the current time T2, the response 112 is no longer complete and accurate with regard to the query parameters 122.

The user feedback module 114 may generate a deprecation determination 124 indicative of the correspondence between the confirmation data 120, the received query 102(2), and the provided response 112. Based on the deprecation determination 124, the user feedback module 114 may generate a notification 126 indicating the possible deprecation of the data entry 110 on which the response 112 was based. The notification 126 may be provided to one or more administrator devices 128 associated with users responsible for the maintenance of the associated data entry 110. In other implementations, notifications 126 may be stored until an administrator device 128 or other device is used to access the stored notifications 126. In still other implementations, one or more services or other computerized programs may be configured to modify or suppress output of data entries 110 based on the generated notifications 126.

Figure 2:
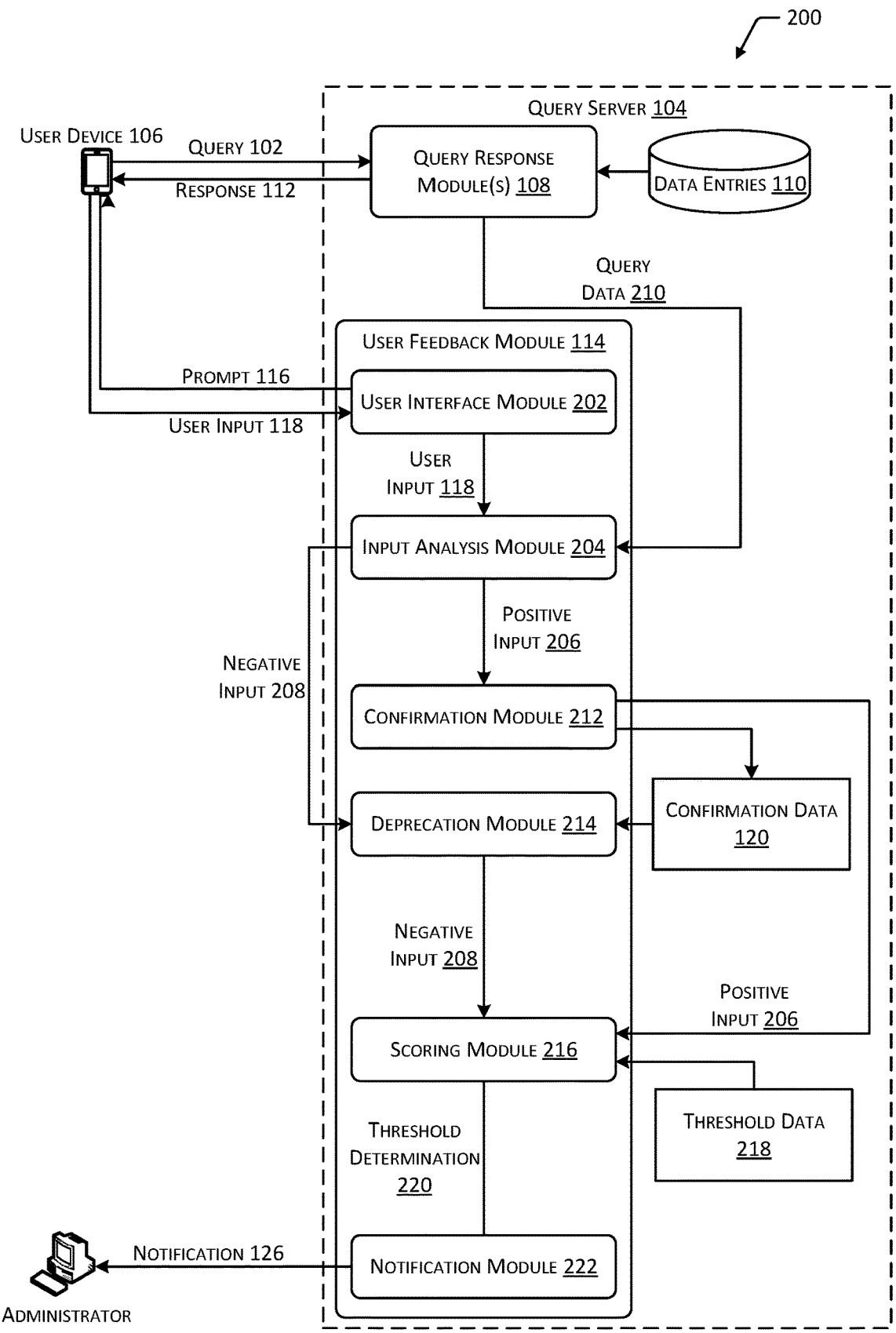
FIG. 2 depicts an implementation of a system for determining deprecation of data entries based on scores determined from user input.

FIG. 2 depicts an implementation of a system 200 for determining deprecation of data entries 110 based on scores determined from user input 118. As discussed with regard to FIG. 1, a user device 106 may provide a query 102 to one or more query response modules 108 of a query server 104, which may determine correspondence between the parameters of the query 102 and one or more data entries 110. One or more corresponding data entries 110 may be used to generate a response 112 which may be provided to the user device 106. A user feedback module 114 associated with the query server 104 may be used to provide a prompt 116 to the user device 106 to request user input 118, which may be used to determine whether the response 112 or associated data entry 110 has deprecated.

Specifically, a user interface module 202 may be configured to generate and provide prompts 116 to user devices 106. The prompts 116 may include any type of user interface able to receive user input 118. For example, a prompt 116 may include one or more of alphanumeric data, audio data, image data, video data, and so forth. Additionally, in some implementations, the prompt 116 may include buttons, selectors, menus, lists, fields for receiving text or other types of data, or other features configured to receive user input 118. The user input 118 may include any type of data including, without limitation, the types of data described with regard to the prompt 116.

An input analysis module 204 may determine whether the user input 118 received by the user interface module 202 includes positive input 206 or negative input 208. Positive input 206 may include an indication that the information included in the response 112 was complete, accurate, or otherwise relevant or useful for resolving the query 102. For example, positive input 206 may include selection of a button labeled "Yes" or "Helpful" or "Accurate", presented within the prompt 116, or the input of text containing similar terms. Negative input 208 may include an indication that the information included in the response 112 was not complete, not accurate, or otherwise unhelpful or non-relevant. For example, negative input 208 may include selection of a button labeled "No" or "Unhelpful" or "Inaccurate", presented within the prompt 116, or the input of text containing similar terms. The input analysis module 204 may also receive query data 210 indicative of the query parameters 122 of the query 102 and the data entry 110 or response 112 that was provided to the user device 106.

If the input analysis module 204 determines that the user input 118 included positive input 206, the input analysis module 204 may provide an indication of the positive input 206 to a confirmation module 212. The confirmation module 212 may generate confirmation data 120 based at least partially on the query data 210. For example, the confirmation data 120 may include an indication of the query parameters 122 of the query 102, stored in association with an indication of the data entry 110 or response 112 that was provided responsive to the query 102. The association between the query parameters 122 and the response 112 may indicate that at a particular time, the response 112 was complete, accurate, or otherwise relevant with regard to a query 102 that included the query parameters 122.

If the input analysis module 204 determines that the user input 118 included negative input 208, the input analysis module 204 may provide an indication of the negative input 208 to a deprecation module 214. Responsive to receipt of the negative input 208, the deprecation module 214 may determine correspondence between the query data 210 and the confirmation data 120. If the query parameters 122 and response 112 indicated in the query data 210 does not correspond to any associated sets of query parameters 122 and responses 112 indicated in the confirmation data 120, then this lack of correspondence may indicate that the data entry 110 determined by the query response module(s) 108 may be improperly classified, or the query 102 may have been improperly analyzed. In some implementations, the negative input 208 may be disregarded in such cases. In other implementations, an indication of the negative input 208 may be provided to one or more query response modules 108 or administrator devices 128 to cause reclassification of one or more data entries 110 or modification of the query analysis process or search algorithms used to determine the data entries 110.

If the query parameters 122 and response 112 indicated in the query data 210 correspond to an associated set of query parameters 122 and response 112 indicated in the confirmation data 120, this correspondence may indicate that a data entry 110 or response 112 that was previously complete and accurate with regard to particular query parameters 122 is no longer complete and accurate with regard to the query parameters 122. In such a case, the data entry 110 may have deprecated, and modification, deletion, or suppression of the data entry 110 may be appropriate.

A scoring module 216 may receive indications of positive input 206, responsive to which a score associated with a data entry 110 may be increased. On each occasion that a data entry 110 is used to respond to a query 102, and the user input 118 indicates that the data entry 110 was complete or accurate, the score for the data entry 110 may be increased by a particular amount. In some implementations, the increases to the score may be a fixed amount. In other implementations, the increases to the score may vary inversely based on one or more of the age of the data entry 110, the total count of queries 102 for which the data entry 110 was previously used in a response 112, or the total count of query parameters 122 associated with the data entry 110.

For example, the score associated with a data entry 110 may be increased by an amount equal to one divided by the square root of the total count of previous queries 102 for which the data entry 110 was used in a response 112.

The scoring module 216 may also receive indications of negative input 208, responsive to which a score associated with the data entry 110 may be decreased. On each occasion that negative input 208 is received and the deprecation module 214 determines that the query data 210 corresponds to the confirmation data 120, the score associated with the data entry 110 may be decreased by a particular amount. In some implementations, the amount by which the score is decreased may be greater than the amount by which the score is increased for each instance of positive input 206. In other implementations, the amount by which the score is decreased may be equal to the amount by which the score is increased for each instance of positive input 206.

The scoring module 216 may also access threshold data 218 indicative of one or more threshold score values. If the score for a particular data entry 110 is less than a corresponding threshold value indicated in the threshold data 218, the scoring module 216 may provide a threshold determination 220 to a notification module 222. Responsive to the threshold determination 220, the notification module 222 may generate one or more notifications 126, which may be stored, provided to an administrator device 128, or used to cause suppression of one or more data entries 110 from output.

In other implementations, other scoring systems may be used. For example, negative input 208 may cause the score for a data entry 110 to increase while positive input 206 causes the score for the data entry 110 to decrease. In still other implementations, positive input 206 may be disregarded, while negative input 208 may cause modification to a score for a data entry 110. In other implementations, the amount by which scores are increased or decreased responsive to user input 118 may be weighted based on the particular user or user device 106 from which the user input 118 is received or the content of the user input 118. For example, user input 118 that indicates that the information within a data entry 110 is dangerous or a potential hindrance may cause a greater modification to the score for a data entry 110 than user input 118 indicating that the information is incomplete.

Figure 3:
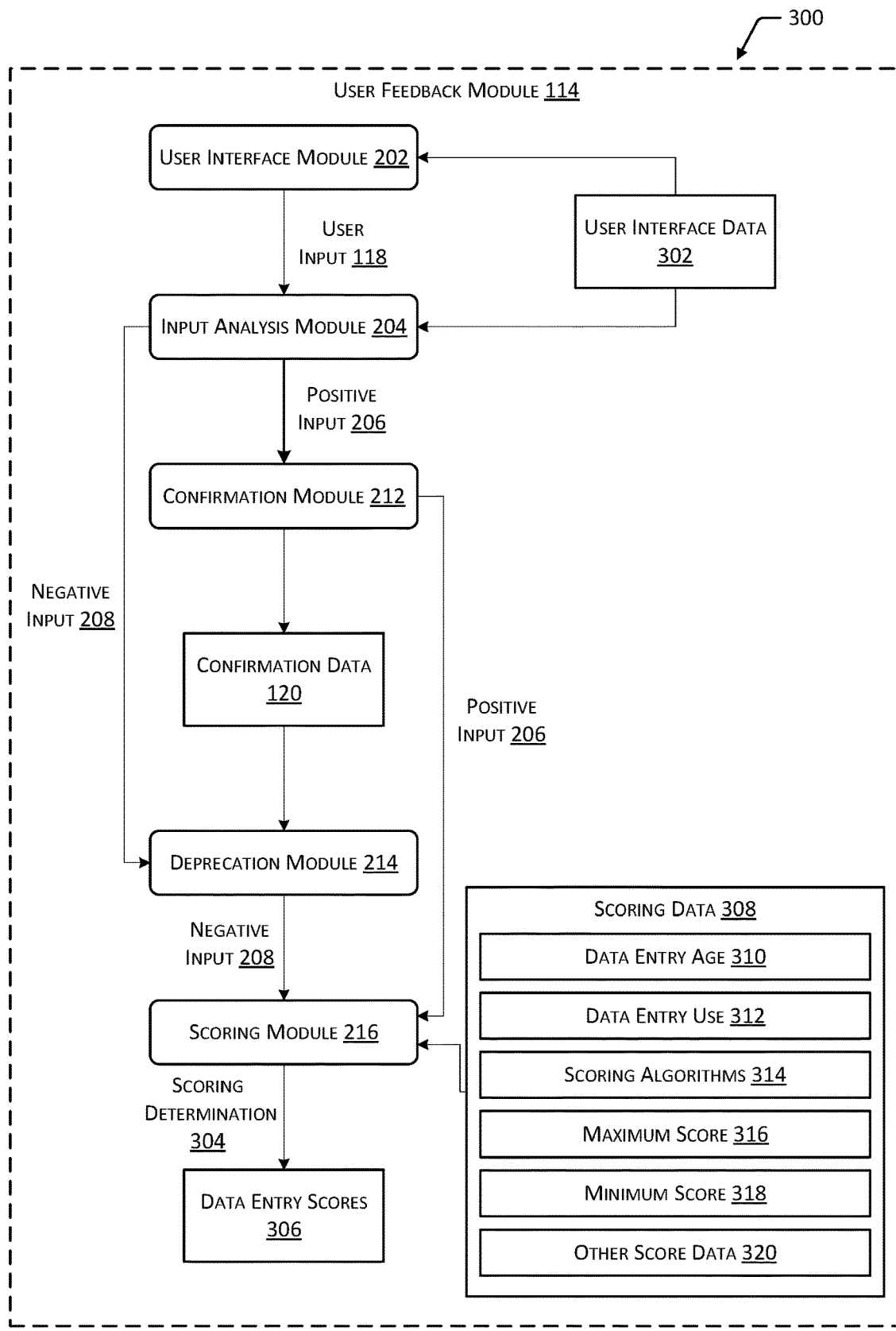
FIG. 3 depicts an implementation of a system for determining and modifying scores associated with data entries.

FIG. 3 depicts an implementation of a system 300 for determining and modifying scores associated with data entries 110. As described with regard to FIG. 2, a user interface module 202 may provide prompts 116 to user devices 106 and receive user input 118 responsive to the prompts 116. The user interface module 202 may access user interface data 302 that may determine the content, format, and other characteristics of the prompts 116 and the types of user input 118 that may be received. An input analysis module 204 may determine whether user input 118 includes positive input 206 or negative input 208 associated with a particular data entry 110. In some implementations, this determination may be based at least in part on the user interface data 302. For example, user interaction with particular features of a prompt 116, such as a button, link, or other type of selector, may be used to indicate positive input 206 or negative input 208.

Positive input 206 may indicate that a particular data entry 110 was complete, accurate, or otherwise relevant with regard to a query 102. In such a case, an indication of the positive input 206 may be provided to a confirmation module 212, which may generate confirmation data 120 that associates the data entry 110 with one or more parameters of the query 102. Negative input 208 may indicate that the particular data entry 110 was incomplete, inaccurate, or otherwise not relevant with regard to the query 102. In such a case, an indication of the negative input 208 may be provided to a deprecation module 214. The deprecation module 214 may determine correspondence between the particular data entry 110 and query 102 and the confirmation data 120. If the confirmation data 120 does not include an association between a data entry 110 and query parameters 122 that at least partially match the particular data entry 110 and query 102, this lack of correspondence may indicate that the data entry 110 was not relevant for reasons other than the accuracy or completeness of the information contained in the data entry 110. However, if the confirmation data 120 corresponds to the data entry 110 and query 102, this correspondence may indicate that the data entry 110 is no longer complete or accurate with regard to particular query parameters 122 for which the data entry 110 was previously complete and accurate.

A scoring module 216 may receive indications of positive input 206 and indications of negative input 208 for which the confirmation data 120 corresponded to the data entry 110 and query 102. For each instance of positive input 206, the scoring module 216 may generate a scoring determination 304 that increases a data entry score 306 for the data entry 110. For each instance of negative input 208, the scoring module 216 may generate a scoring determination 304 that decreases the data entry score 306. As described with regard to FIG. 2, if a data entry score 306 is less than a threshold value, one or more notifications 126 may be generated to cause modification, deletion, or suppression of the data entry 110. The particular amount by which the data entry score 306 is modified may be based at least in part on scoring data 308.

The scoring data 308 may include one or more factors on which the modification to a data entry score 306 may be based. For example, the scoring data 308 may include one or more data entry ages 310. A data entry age 310 may include a length of time that a data entry 110 has existed. In some cases, a data entry age 310 may be measured from the time that the data entry 110 was created until the present time. In other cases, a data entry age 310 may be measured from the most recent time that the data entry 110 was modified or the most recent time at which the accuracy of the data entry 110 was confirmed, such as by an administrative user responsible for maintaining the data entry 110.

The scoring data 308 may further include one or more indications of data entry use 312. Data entry use 312 may include an indication of the number of times a particular data entry 110 was used in a response 112 provided to a user device. In other implementations, data entry use 312 may indicate a count of previous queries 102 associated with the data entry 110 or a count of query parameters 122 associated with the data entry 110. For example, indications of data entry use 312 may be determined in part using the confirmation data 120. Data entry use 312 may also include indications of a number of times that positive input 206, negative input 208, or total user input 118 has been received with regard to a data entry 110.

The scoring data 308 may also include one or more scoring algorithms 314. In some implementations, a scoring algorithm 314 may be based at least in part on one or more of a data entry age 310 or data entry use 312. For example, in one implementation, the amount by which a data entry score 306 is increased responsive to positive input 206 may be inversely related to the data entry age 310 or data entry use 312. Continuing the example, responsive to positive input 206, a data entry score 306 for a particular data entry 110 may be increased by an amount equal to one divided by the square root off the total count of previous responses 112 that have been based on the data entry 110. In other implementations, the data entry score 306 may be increased by a fixed amount or a percentage amount responsive to positive input 206, independent of the data entry age 310 or data entry use 312. The scoring algorithms 314 may also determine the amount by which a data entry score 306 is decreased responsive to negative input 208. In some implementations, the amount by which the data entry score 306 is decreased responsive to a single instance of negative input 208 may be greater than the amount by which the data entry score 306 is increased responsive to a single instance of positive input 206.

The scoring data 308 may also include an indication of a maximum score 316 or a minimum score 318. For example, if increasing a data entry score 306, based on a scoring algorithm 314, would increase the data entry score 306 beyond the maximum score 316, the scoring determination 304 may be disregarded. In other cases, the data entry score 306 may be increased to the maximum score 316. Similarly, if decreasing the data entry score 306 would result in the data entry score 306 being less than the minimum score 318, the scoring determination 304 may be disregarded, or the data entry score 306 may be reduced to the minimum score 318.

Other score data 320 may include weights or modifications applied to data entry scores 306 based on the identity of particular users. For example, user input 118 received from administrative users or users having selected characteristics may result in a larger modification to a data entry score 306 than user input 118 from other users. Weights and modifications may also be applied to data entry scores 306 based on the content of user input 118. For example, user input 118 may indicate that the information contained in a data entry 110 is a hindrance, potentially dangerous, includes confidential information, and so forth. In such cases, the amount by which a data entry score 306 is decreased may be larger than the amount by which the data entry score 306 is decreased responsive to user input 118 indicating that a data entry 110 is incomplete. Weights and modifications may further be applied based on the content of a data entry 110. For example, scores for data entries 110 associated with particular departments or particular types of information may be weighted toward preserving the data entries 110, while scores for other data entries 110 may be weighted toward causing modification of the data entries 110.

Figure 4:
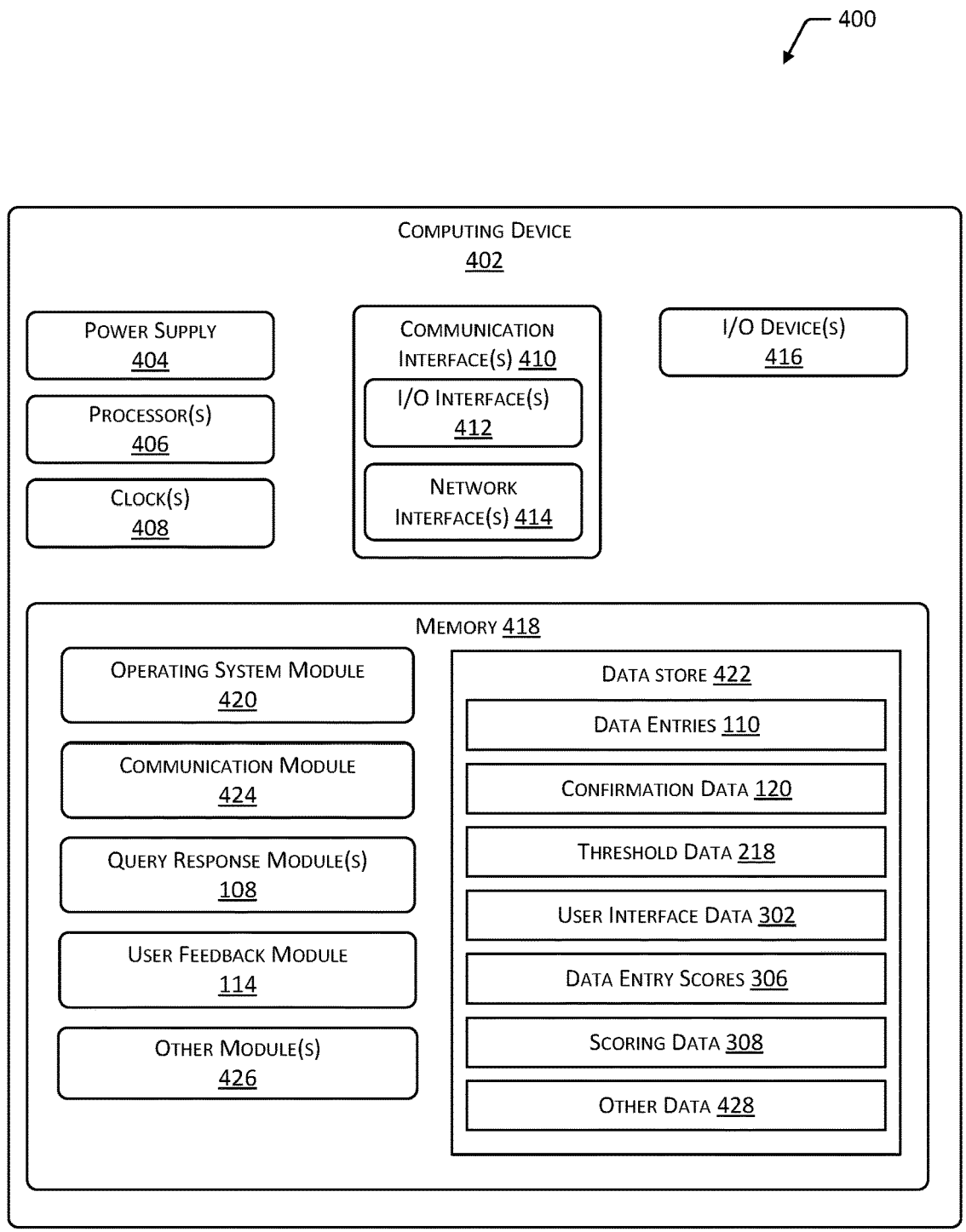
FIG. 4 is a block diagram depicting a computing device within the scope of the present disclosure.

FIG. 4 is a block diagram 400 depicting a computing device 402 within the scope of the present disclosure. While FIG. 4 depicts a single computing device 402, the computing device 402 may include any number and any type of computing device 402. For example, computing functions described within the scope of the present disclosure may be performed by multiple computing devices 402, such as a distributed network of query servers 104 or other computing devices 402 in communication therewith. For example, a first computing device 402 may store one or more modules that may act upon data stored in a second computing device 402. The computing device 402 may include, without limitation, one or more servers, personal computers, smartphones or other mobile devices, set-top boxes, tablet computers, wearable computers, automotive computers, and so forth. For example, the computing device 402 may include a query server 104, a user device 106, or an administrator device 128, such as those described with regard to FIGS. 1 and 2, or any other computing device 402 in communication therewith.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clocks 408 may provide information indicative of date, time, ticks, and so forth. For example, the processor(s) 406 may use data from the clock 408 to generate a timestamp, trigger a preprogrammed action, and so forth.

The computing device 402 may include one or more communication interface(s) 410, such as input/output (I/O) interface(s) 412, network interface(s) 414, and so forth. The communication interfaces 410 may enable the computing device 402, or components of the computing device 402, to communicate with other computing devices 402 or components thereof. The I/O interface(s) 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O device(s) 416. The I/O devices 416 may include any manner of input device or output device associated with the computing device 402 or with another computing device 402 in communication therewith. For example, I/O devices 416 may include touch sensors, keyboards, mouse devices, microphones, image sensors (e.g., cameras), scanners, displays, speakers, lights, haptic devices, printers, motion sensors, location sensors, and so forth. In some implementations, the I/O device(s) 416 may be physically incorporated with a computing device 402 or may be externally placed.

The network interface(s) 414 may be configured to provide communications between the computing device 402 and other devices, such as the I/O devices 416, routers, access points, user devices 106, administrator devices 128, other computing devices 402, and so forth. The network interface(s) 414 may include devices configured to couple to one or more networks, including local area networks (LANs), wireless LANs, wide area networks (WANs), wireless WANs, and so forth. For example, the network interfaces 414 may include computing devices 402 compatible with Ethernet, Wi-Fi, Wi-Fi Direct, Bluetooth, Bluetooth Low Energy, ZigBee, Z-Wave, 3G, 4G, LTE, and so forth.

The computing device 402 may include one or more busses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 422 and one or more of the following modules may also be stored in the memory 418. The modules may be executed as foreground applications, background tasks, daemons, and so forth. The data store 422 may use a flat file, database, linked list, tree, executable code, script, or other data structure to store information. In some implementations, the data store 422 or a portion of the data store 422 may be distributed across one or more other devices including other computing devices 402, network attached storage devices, and so forth.

A communication module 424 stored in the memory 418 may be configured to establish communications with user devices 106, query servers 104, administrator devices 128, or other computing devices 402. For example, the communication module 424 may be configured to receive queries 102 from user devices 106 or other computing devices 402 and to provide responses 112, notifications 126, or other data to other computing devices 402.

The memory 418 may store one or more query response modules 108. The query response modules 108 may receive and process queries 102 from other computing devices 402, determine query parameters 122 associated with the queries 102, and determine data entries 110 having one or more parameters that correspond to the query parameters 122. The query response modules 108 may generate a response 112 based at least in part on one or more data entries 110. Example techniques for determining data entries 110 that are responsive to queries 102 are described in U.S. patent application Ser. No. 15/373,312, incorporated by reference previously.

The memory 418 may also store the user feedback module 114. As discussed with regard to FIGS. 1-3, the user feedback module 114 may generate prompts 116 to be provided to other computing devices 402 and receive user input 118 responsive to the prompts 116. The user feedback module 114 may process the user input 118 to determine instances of positive input 206 and negative input 208. The user feedback module 114 may modify data entry scores 306 associated with data entries 110 in a first direction based on positive input 206. Additionally, the user feedback module 114 may generate confirmation data 120 that associates a received query 102 with the data entry 110 used to generate the response 112 to the query 102. When negative input 208 is determined, the user feedback module 114 may determine whether the query 102 and data entry 110 associated with the negative input 208 correspond to the confirmation data 120. If correspondence between query 102, data entry 110, and confirmation data 120 is determined, the user feedback module 114 may modify the data entry score 306 for the data entry 110 in a second direction. The user feedback module 114 may also determine whether the data entry score 306 for a data entry 110 deviates from threshold data 218. Responsive to a deviation from the threshold data 218, the user feedback module 114 may cause a notification 126 to be generated, such as for provision to another computing device 402. In some implementations, the user feedback module 114 may cause data entries 110 for which the data entry score 306 deviates from the threshold data 218 to be suppressed from output to other computing devices 402.

Other modules 426 may also be present in the memory 418. For example, encryption modules may be used to encrypt and decrypt communications between computing devices 402. User account modules may be configured to receive and process user data, which may be used to identify users. The identity of particular user accounts associated with user input 118 may be used to weight the amount by which a data entry score 306 is modified responsive to the user input 118. Administrator modules may be used to modify default settings and preferences. Machine learning modules may be configured to determine relationships between queries 102 and data entries 110 and to track the user input 118 received with regard to one or more data entries 110.

Other data 428 within the data store 422 may include default configurations and settings associated with computing devices 402. Other data 428 may also include security data, such as encryption keys and schema, access credentials, and so forth.

In different implementations, different computing devices 402 may have different capabilities or capacities. For example, query servers 104 may have significantly more processor 406 capability and memory 418 capacity compared to the processor 406 capability and memory 418 capacity of user devices 106.

Figure 5:
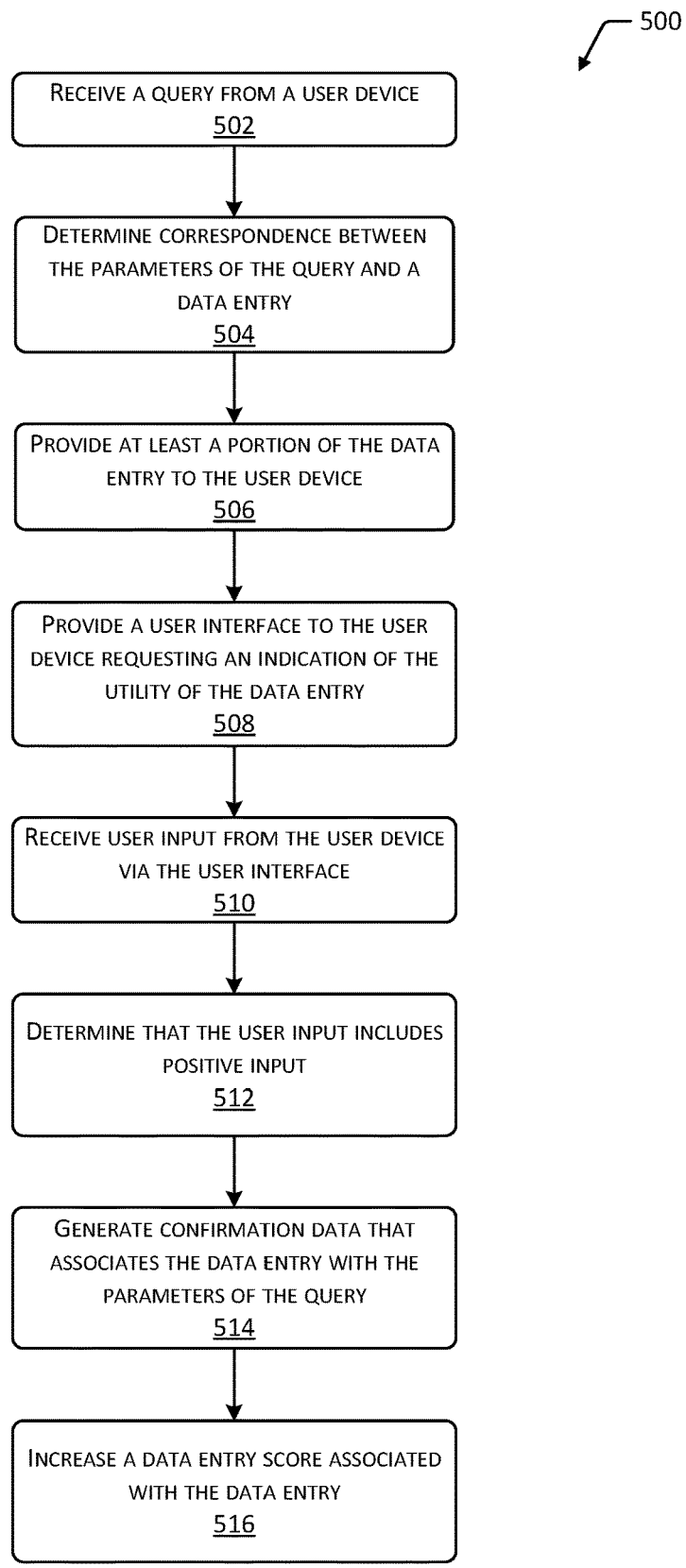
FIG. 5 is a flow diagram illustrating a method for generating confirmation data and modifying a data entry score based on positive user input.

FIG. 5 is a flow diagram 500 illustrating a method for generating confirmation data 120 and modifying a data entry score 306 based on positive user input 118. Block 502 receives a query 102 from a user device 106. As discussed with regard to FIGS. 1 and 2, a user device 106 may provide a query 102 to a query server 104 or other type of computing device 402. The query 102 may include one or more of alphanumeric data, audio data, image data, video data, or other types of data. Additionally, the query 102 may include one or more query parameters 122 such as the terms of the query 102, the arrangement of the terms, use of punctuation and formatting, and so forth.

Block 504 determines correspondence between the parameters of the query 102 and a data entry 110. Each data entry 110 may be associated with one or more parameters. A query response module 108 may determine correspondence between one or more parameters of a data entry 110 and one or more query parameters 122 of a query 102. Example techniques for determining particular data entries 110 for use responding to a query 102 are described in U.S. patent application Ser. No. 15/373,312, incorporated by reference previously.

Block 506 provides at least a portion of the data entry 110 to the user device 106. A response 112 may include any type of data, including without limitation alphanumeric data, audio data, image data, video data, and so forth. One or more query response modules 108 may determine the particular format or content of a response 112. For example, in some cases, the response 112 may include a copy of a data entry 110, while in other cases, the response 112 may include a link or other means to access a data entry 110. In still other cases, a response 112 may include at least a portion of a data entry 110 and additional data, such as instructions, formatting data, and so forth that may affect the characteristics and content of the response 112.

Block 508 provides a user interface to the user device 106 requesting an indication of the utility of the data entry 110. For example, the user interface may include a prompt 116 or other type of interface configured to receive user input 118 from the user device 106. The user interface may include any type of data including, without limitation, alphanumeric data, audio data, image data, video data, and so forth. The user interface may include any manner of feature configured to receive user input 118, such as buttons, menus, lists, or other selectors, fields for receiving text, features for receiving audio input, and so forth.

Block 510 receives user input 118 from the user device 106 via the user interface. The user input 118 may include any type of data including, without limitation, the types of data discussed with regard to the user interface. For example, the user input 118 may include selection of a button labeled "Yes" responsive to a prompt 116 presenting the text "Did the response resolve your query?"

Block 512 determines that the user input 118 includes positive input 206. As discussed with regard to FIGS. 2 and 3, an input analysis module 204 may determine whether user input 118 includes positive input 206 or negative input 208. In some implementations, an input analysis module 204 may differentiate positive input 206 from negative input 208 based on user interface data 302 indicating the features of the user interface provided to the user device 106. Positive input 206 may include an indication that the information included in the response 112 was complete, accurate, or otherwise relevant or useful for resolving the query 102. Negative input 208 may include an indication that the information included in the response was not complete, not accurate, or otherwise unhelpful or non-relevant. In some cases, negative input 208 may include an indication that the information associated with a data entry 110 was a hindrance, dangerous, or included confidential information.

Block 514 generates confirmation data 120 that associates the data entry 110 with the parameters of the query 102. For example, confirmation data 120 may include sets of data entries 110, each respective data entry associated with one or more query parameters 122 of a query 102 for which the data entry 110 was used in a response 112. The relationships between data entries 110 and query parameters 122 in the confirmation data 120 may indicate that at a previous time, a data entry 110 was suitable for resolving a query 102 that included the associated query parameters 122.

Block 516 increases a data entry score 306 associated with the data entry 110 responsive to receipt of the positive input 206. As discussed with regard to FIG. 3, the amount by which the data entry score 306 is modified may be determined based on scoring data 308. In some implementations, the confirmation data 120 may be generated based on the data entry score 306 exceeding a threshold value. For example, if a single instance of positive input 206 is received with regard to a data entry 110, the data entry score 306 may be increased, but the generation of confirmation data 120 at block 514 may be omitted until it is determined that the data entry score 306 for the data entry 110 exceeds the threshold value.

Figure 6:
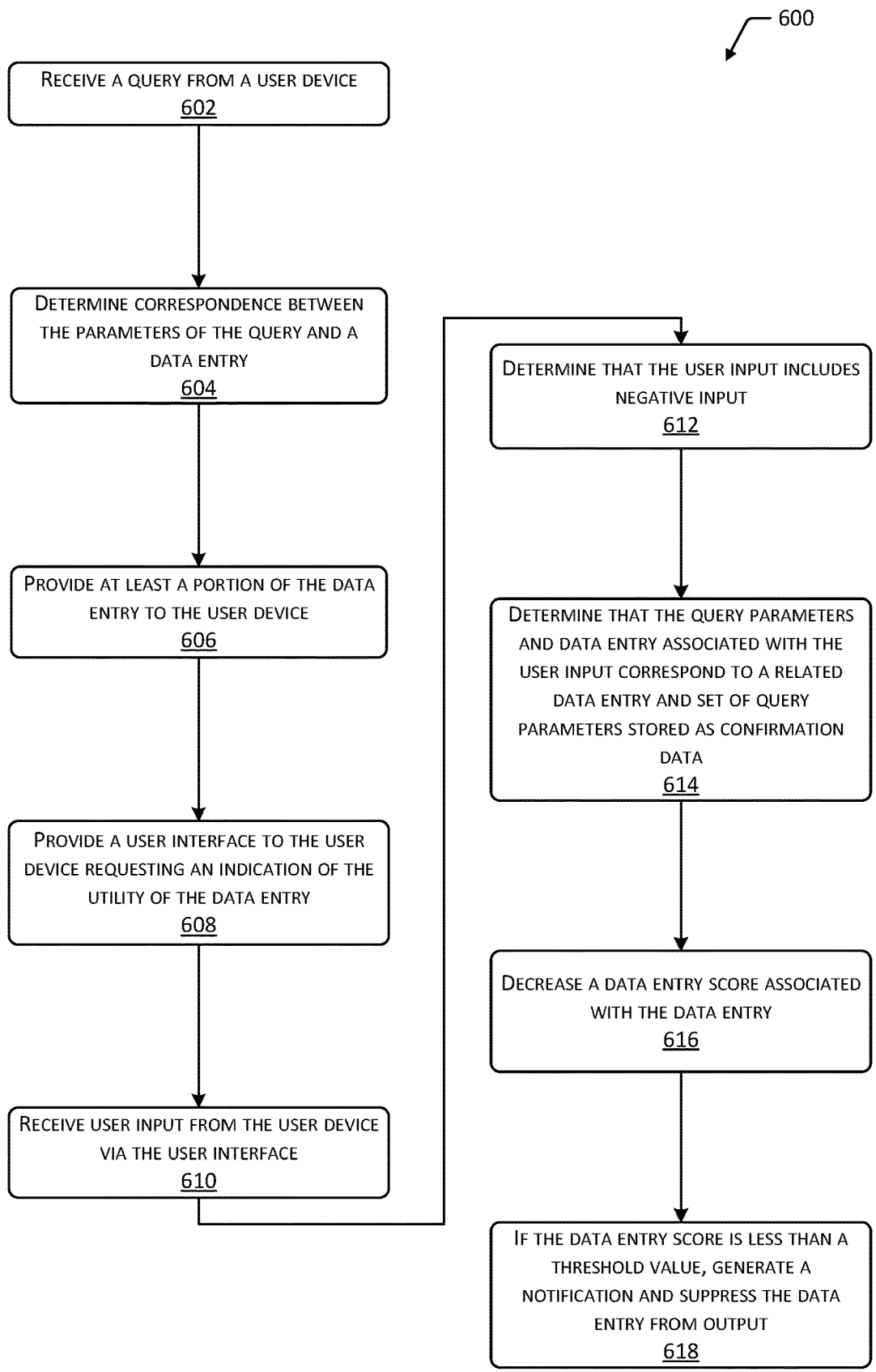
FIG. 6 is a flow diagram illustrating a method for generating a notification and modifying a data entry score based on negative user input.

FIG. 6 is a flow diagram 600 illustrating a method for generating a notification 126 and modifying a data entry score 306 based on negative user input 118. Similar to the method described with regard to FIG. 5, block 602 receives a query 102 from a user device 110. Block 604 determines correspondence between the parameters of the query 102 and a data entry 110. Block 606 provides at least a portion of the data entry 110 to the user device 106. Block 608 provides a user interface to the user device 106 requesting an indication of the utility of the data entry 110. Block 610 receives user input 118 from the user device 106 via the user interface. Block 612 determines that the user input 118 includes negative input 208. As described with regard to FIGS. 2 and 5, an input analysis module 204 may differentiate positive input 206 from negative input 208.

Block 614 determines that the query parameters 122 and data entry 110 associated with the user input 118 correspond to a related data entry 110 and set of query parameters 122 stored as confirmation data 120. As described with regard to FIGS. 1 and 5, confirmation data 120 may indicate an association between a data entry 110 and one or more query parameters 122. The association of the confirmation data 120 may indicate that the data entry 110 was previously used to successfully resolve a query 102. If the query parameters 122 and data entry 110 do not correspond to the confirmation data 120, this lack of correspondence may indicate that a non-relevant data entry 110 was determined for inclusion in a response 112 to the user device 106. However, if the query parameters 122 and data entry 110 correspond to the confirmation data 120, this correspondence may indicate that a data entry 110 that was previously suitable for resolving a query 102 having particular parameters is no longer suitable for resolving similar queries 102. For example, one or more circumstances associated with an organization may have changed between the time when the confirmation data 120 was generated and the time that the negative input 208 was received.

Block 616 decreases a data entry score 306 associated with the data entry 110. As described with regard to FIG. 3, the amount by which the data entry score 306 is modified may be determined in part based on scoring data 308.

Block 618 determines whether the data entry score 306 is less than a threshold value. If the data entry score 306 is less than a threshold value, a notification 126 may be generated, and the data entry 110 may be suppressed from output. For example, if a sufficient number of instances of negative input 208 are received with regard to a data entry 110, this may indicate that the data entry 110 has deprecated. A notification 126 indicative of the potential deprecation of the data entry 110 may be provided to an administrator device 128 or other computing device 402, or stored for future access. Additionally, until the notification 126 is addressed, such as by an administrative user or an automated process, the data entry 110 may be suppressed from further use in responses 112 to prevent the provision of potentially inaccurate or incomplete information to users. If, responsive to the notification 126, the data entry 110 is subsequently modified, or if an administrative user or automated process confirms the completeness and accuracy of the data entry 110, the data entry score 306 may be reset to a default value or increased to a value greater than the threshold score.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Further-more, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
receive a first query including one or more first query parameters;
determine a first data entry based on first correspondence between the one or more first query parameters and a plurality of data entries;
provide a first response including at least a portion of the first data entry;
receive first user input indicating that the first data entry is responsive to the first query;
in response to the first user input indicating that the first data entry is responsive to the first query, store confirmation data that indicates an association between the first data entry and the one or more first query parameters;
receive a second query including one or more second query parameters, wherein a first augmented query based on the one or more second query parameters at least partially matches a second augmented query based on the one or more first query parameters;
determine, based on second correspondence between the one or more second query parameters and the plurality of data entries, that the first data entry corresponds to the second query;
provide a second response including the at least a portion of the first data entry;
receive second user input indicating that the first data entry is not responsive to the second query;
in response to the second user input indicating that the first data entry is not responsive to the second query, determine that the association between the first data entry and the one or more first query parameters indicated by the confirmation data at least partially matches the second augmented query based on the one or more second query parameters of the second query; and
in response to the association at least partially matching the second augmented query based on the one or more second query parameters, generate a notification indicative of deprecation of the first data entry.

2. The system of claim 1, further comprising computer-executable instructions to:
responsive to the first user input, increase a quality score associated with the confirmation data;
responsive to the second user input, decrease the quality score; and
determine that the quality score is less than a threshold quality score;
wherein the notification is generated responsive to the quality score being less than the threshold quality score.

3. The system of claim 1, further comprising computer-executable instructions to:
determine one or more of a count of query parameters associated with the first data entry or an age of the first data entry;
responsive to the first user input, increase a quality score associated with the confirmation data by a first amount that is inversely proportional to the one or more of the count of query parameters or the age;
responsive to the second user input, decrease the quality score by a second amount greater than the first amount; and
determine that the quality score is less than a threshold quality score;
wherein the notification is generated responsive to the quality score being less than the threshold quality score.

4. The system of claim 1, further comprising computer-executable instructions to:
responsive to the second user input, decrease a quality score associated with the confirmation data;
determine that the quality score is less than a threshold quality score, wherein the notification is generated responsive to the quality score being less than the threshold quality score;
receive third user input responsive to the notification, the third user input confirming relevancy of the first data entry; and
set the quality score to a default value greater than the threshold quality score.

5. The system of claim 1, further comprising computer-executable instructions to:
responsive to the first user input, increase a first quality score associated with the confirmation data by a first amount;
responsive to the second user input, decrease the first quality score;
determine that the first quality score is less than a threshold quality score, wherein the notification is generated responsive to the first quality score being less than the threshold quality score;
responsive to the notification, receive third user input indicative of a second data entry responsive to the second query; and
increase a second quality score associated with the second data entry by a second amount, wherein the second amount is greater than the first amount.

6. The system of claim 1, further comprising computer-executable instructions to:
determine that the second user input includes an indication of erroneous information within the at least a portion of the first data entry;
wherein the notification is generated responsive to the indication of the erroneous information.

7. The system of claim 1, further comprising computer-executable instructions to:
responsive to the second user input, decrease a quality score associated with the confirmation data;
determine that the quality score is less than a threshold quality score, wherein the notification is generated responsive to the quality score being less than the threshold quality score;
responsive to the notification, receive third user input modifying the first data entry; and
responsive to the third user input, set the quality score to a default value greater than the threshold quality score.

8. A method comprising:
receiving a first query at a first time, wherein the first query includes one or more first query parameters;
generating confirmation data that indicates an association between a data entry and the one or more first query parameters;
at a second time subsequent to the first time, providing the data entry responsive to a second query that includes one or more second query parameters;
receiving first user input indicating that the data entry is not responsive to the second query;
in response to the first user input, determining that the one or more first query parameters indicated in the association of the confirmation data at least partially correspond to the one or more second query parameters of the second query; and
in response to the one or more first query parameters indicated in the association of the confirmation data at least partially corresponding to the one or more second query parameters of the second query, generating a notification indicative of deprecation of the data entry.

9. The method of claim 8, further comprising:
providing the data entry responsive to the first query; and
receiving second user input indicating that the data entry is responsive to the first query;
wherein the confirmation data is generated in response to the second user input.

10. The method of claim 9, further comprising:
responsive to the second user input, increasing a quality score associated with the confirmation data;
responsive to the first user input, decreasing the quality score; and
determining that the quality score is less than a threshold quality score;
wherein the notification is generated responsive to the quality score being less than the threshold quality score.

11. The method of claim 10, further comprising:
determining one or more of a count of queries associated with the data entry or an age of the data entry;
wherein the quality score is increased by a first amount that is inversely proportional to the one or more of the count of queries or the age and is decreased by a second amount, wherein the second amount is greater than the first amount.

12. The method of claim 10, further comprising:
receiving third user input responsive to the notification, wherein the third user input one or more of: modifies the data entry or confirms the data entry; and
setting the quality score to a default value greater than the threshold quality score.

13. The method of claim 8, further comprising:
responsive to the first user input, decreasing a quality score associated with the data entry; and
determining that the quality score is less than a threshold quality score;
wherein the notification is generated responsive to the quality score being less than the threshold quality score.

14. The method of claim 8, further comprising:
receiving a third query that corresponds to the data entry;
determining that second user input responsive to the notification has not been received; and
suppressing the data entry from output in a response to the third query.

15. A system comprising:
one or more memories storing computer-executable instructions; and
one or more hardware processors to execute the computer-executable instructions to:
at a first time, provide a data entry responsive to a first query, wherein the first query includes a first parameter;
receive first user input indicating that the data entry is relevant to the first query;
in response to the first user input, generate confirmation data that includes an association between the data entry and the first parameter;
at a second time subsequent to the first time, provide the data entry responsive to a second query that includes a second parameter;
receive second user input indicating that the data entry is not relevant to the second query;
in response to the second user input, determine that the first parameter of the association indicated in the confirmation data corresponds to the second parameter of the second query; and
in response to the first parameter corresponding to the second parameter, generate a notification indicative of deprecation of the data entry.

16. The system of claim 15, further comprising computer-executable instructions to:
receive a third query that corresponds to the data entry;
determine that third user input responsive to the notification has not been received; and
suppress the data entry from output in a response to the third query.

17. The system of claim 15, further comprising computer-executable instructions to:
- increase a quality score associated with the confirmation data responsive to the first user input;
- decrease the quality score responsive to the second user input; and
- determine that the quality score is less than a threshold quality score;
- wherein the notification is generated responsive to the quality score being less than the threshold quality score.

18. The system of claim 17, wherein the quality score is increased by a first amount and decreased by a second amount greater than the first amount.

19. The system of claim 15, further comprising computer-executable instructions to:
- determine one or more of an age of the data entry or a count of parameters associated with the confirmation data;
- responsive to the first user input, increase a quality score associated with the confirmation data by a first amount that is inversely proportional to the one or more of the age or the count of parameters;
- responsive to the second user input, decrease the quality score by a second amount greater than the first amount; and
- determine that the quality score is less than a threshold quality score;
- wherein the notification is generated responsive to the quality score being less than the threshold quality score.

20. The system of claim 15, further comprising computer-executable instructions to:
- responsive to the second user input, decrease a quality score associated with the confirmation data;
- determine that the quality score is less than a threshold quality score, wherein the notification is generated responsive to the quality score being less than the threshold quality score;
- responsive to the notification, receive third user input that one or more of modifies or confirms the data entry; and
- increase the quality score to a value greater than the threshold quality score.

* * * * *